United States Patent [19]
Dixit

[11] Patent Number: 5,328,654
[45] Date of Patent: Jul. 12, 1994

[54] ORIENTATION OF NEVER-DRIED MOLECULAR COMPOSITE FILMS

[75] Inventor: Thuan P. Dixit, Midland, Mich.

[73] Assignee: The Dow Chemical Company, Midland, Mich.

[21] Appl. No.: 956,536

[22] Filed: Oct. 5, 1992

[51] Int. Cl.$^5$ .................. B29C 55/02; B29C 55/12
[52] U.S. Cl. .................. 264/289.3; 264/108; 264/184; 264/289.6
[58] Field of Search ............ 264/108, 171, 173, 174, 264/181, 184, 210.2, 210.7, 211, 211.19, 233, 289.3, 289.6

[56] References Cited

U.S. PATENT DOCUMENTS

| | | |
|---|---|---|
| 4,487,735 | 12/1984 | Chenevey . |
| 4,614,784 | 9/1986 | Kozakiewicz . |
| 4,631,318 | 12/1986 | Hwang et al. . |
| 4,810,735 | 3/1989 | Uy . |
| 4,898,924 | 2/1990 | Chenevey . |
| 4,939,235 | 7/1990 | Harvey et al. . |
| 4,963,428 | 10/1990 | Harvey et al. . |
| 4,972,028 | 11/1990 | Uy . |
| 4,977,223 | 12/1990 | Arnold et al. . |
| 5,041,506 | 8/1991 | Kumata et al. . |
| 5,075,392 | 12/1991 | Harris et al. . |
| 5,089,568 | 2/1992 | Harris et al. . |
| 5,098,985 | 3/1992 | Harris et al. . |
| 5,110,894 | 5/1992 | Harris et al. . |
| 5,137,986 | 8/1992 | Uy . |
| 5,151,489 | 9/1992 | Harris et al. .......... 528/183 |

OTHER PUBLICATIONS

Webster's Ninth New Collegiate Dictionary, Mish et al. Eds, Merriam-Webster Inc. 1986 p. 774.
Hwang et al., "Concept and Overview of Rigid Rod Molecular Composites," The Materials Science and Engineering of Rigid-Rod Polymers at 507-09 (Materials Research Society 1989).
07/547650, Hwang et al. Feb. 2, 1990.
07/562781, Hwang et al., Aug. 6, 1990.
07/670135, Pierini et al., Mar. 15, 1991.
07/859177, Dixit et al., Mar. 27, 1992.

Primary Examiner—Catherine Timm

[57] ABSTRACT

Improved films that contain molecular composites or block copolymers of lyotropic liquid crystalline polymer and thermoplastic polymer can be made by the steps of:
(1) washing a dope film, that contains a solvent and the molecular composite or block copolymer;
(2) stretching the wet, never-dried film from Step (1) in at least one direction; and
(3) drying the film from Step (2).

The films have improved mechanical properties and can be used in structural applications.

8 Claims, No Drawings

ORIENTATION OF NEVER-DRIED MOLECULAR COMPOSITE FILMS

STATEMENT OF GOVERNMENT RIGHTS

This invention was made with Government support under contract F33615-86-C-5068 awarded by the Department of the Air Force. The Government has certain rights in this invention.

BACKGROUND OF THE INVENTION

The present invention relates to films that contain either molecular composites of lyotropic liquid crystalline polymers and thermoplastic polymers or block copolymers having rigid or semi-rigid blocks and thermoplastic blocks.

Lyotropic liquid crystalline polymers include polymers such as aramids and polybenzazole polymers. Such polymers are difficult to fabricate into useful shaped objects. Therefore, liquid crystalline polymers are sometimes intimately admixed with thermoplastic polymers to form molecular composites. See, e.g., Hwang et al., "Concept and Overview of Rigid Rod Molecular Composites," *The Materials Science and Engineering of Rigid-Rod Polymers* at 507-09 (Materials Research Society 1989), which is incorporated herein by reference. It is also known to make block copolymers that contain blocks of thermoplastic polymer and blocks of rigid or semi-rigid polymer. See Harris et al., U.S. Pat. No. 5,089,586 (Feb. 18, 1992); Harris et al., U.S. Pat. No. 5,075,392 (Dec. 24, 1991); Hwang et al., U.S. Ser. No. 07/547,650 (filed Jul. 2, 1990) and Hwang et al., U.S. Ser. No. 07/562,781 (filed Aug. 6, 1990), which are incorporated herein by reference.

Molecular composites and block copolymers are typically fabricated into shaped articles by coagulation from a dope solution. For instance, a dope containing a molecular composite or block copolymer dissolved in a solvent acid may be extruded through a slit die or a tubular die to form a dope film. The dope film is contacted with water or a similar coagulating liquid so that a polymer film is formed. It would be desirable to improve the mechanical properties of such polymer films.

SUMMARY OF THE INVENTION

The present invention is a process to make an improved film that contains either: (a) a molecular composite of lyotropic liquid crystalline polymer and thermoplastic polymer, or (b) a block copolymer having blocks of lyotropic liquid crystalline polymer and blocks of thermoplastic polymer, said process comprising the steps of:

(1) contacting a dope film, that contains a solvent and the molecular composite or block copolymer, with a washing fluid under conditions such that most of the solvent is removed from the film;

(2) stretching the wet, never-dried film from Step (1) at least 10 percent in at least one direction; and (3) drying the film from Step (2).

Wet stretching of the film permits effective orientation of the film, to increase the tensile properties of the film in the direction that it is stretched. The stretched film may be used in structural applications such as honeycomb, circuit board substrates or capacitor films.

DETAILED DESCRIPTION OF THE INVENTION

The present invention uses either a molecular composite or a block copolymer. It preferably uses a block copolymer.

Suitable molecular composites contain a lyotropic liquid crystalline polymer and a thermoplastic polymer. The lyotropic liquid crystalline polymer is preferably a polybenzazole polymer or an aramid polymer. It is more preferably a polybenzoxazole polymer or a polybenzothiazole polymer. It is most preferably a polybenzoxazole polymer. The thermoplastic polymer should be soluble in an acid that will dissolve the lyotropic liquid crystalline polymer, and should be recoverable from the acid by contact with a coagulating liquid that will also coagulate the lyotropic liquid crystalline polymer. Examples of suitable thermoplastic polymers include polyether ether ketone, thermoplastic polyamides, and copolymers of those polymers. The molecular composite preferably contains at least 5 weight percent of lyotropic liquid crystalline polymer and at least 5 weight percent of thermoplastic polymer. It more preferably contains at least 10 weight percent of each polymer, and most preferably contains at least about 25 weight percent of each. Examples of suitable molecular composites and methods to make them are described in: Uy, U.S. Pat. No. 4,810,735 (Mar. 7, 1989), Uy, U.S. Pat. No. 4,972,028 (Nov. 20, 1990); Uy, U.S. Pat. No. 5,137,986 (Aug. 11, 1992); Kumata et al., U.S. Pat. No. 5,042,506 (Aug. 20, 1991); Arnold et. al., U.S. Pat. No. 4,977,223 (Dec. 11, 1990); Hwang et. al., U.S. Pat. No. 4,631,318 (Dec. 23, 1986); and Kozakiewicz, U.S. Pat. No. 4,614,784 (Sep. 30, 1986), which are incorporated herein by reference.

Block copolymers useful in the present invention contain blocks of lyotropic liquid-crystalline polymer and blocks of thermoplastic polymer. The lyotropic liquid-crystalline polymer is preferably a polybenzoxazole or polybenzothiazole polymer, and is more preferably a polybenzoxazole polymer. It is preferably a rigid-rod polymer. Each lyotropic liquid-crystalline block preferably comprises on average between about 5 and 50 repeating units, and more preferably between about 8 and 25 repeating units. The thermoplastic polymer blocks are preferably thermoplastic polyamide, polyaromatic either ketone, polyaromatic ether sulfone, or a copolymer of those polymers. The block copolymer preferably contains at least about 5 weight percent each of lyotropic liquid-crystalline blocks and thermoplastic blocks. It more preferably contains at least about 10 weight percent of each and most preferably contains at least about 25 weight percent of each. Examples of suitable block copolymers and methods to make them are described in Harris et al., U.S. Pat. No. 5,075,392 (Dec. 24, 1991); Harris et al., U.S. Pat. No. 5,089,568 (Feb. 18, 1992); Harris et al., U.S. Pat. No. 5,098,985 (Mar. 24, 1992); and Harris et al., U.S. Pat. No. 5,110,894 (May 5, 1992), which are incorporated herein by reference.

The block copolymer or molecular composite is dissolved in an appropriate solvent acid, such as polyphosphoric acid, methanesulfonic acid, or sulfuric acid, to form a dope. The concentration of polymers is preferably low enough so that the solution does not contain substantial liquid crystalline domains (i.e. the solution is isotropic). Preferably, the solution will contain no more than about 4 weight percent lyotropic liquid-crystalline polymer or blocks, and more preferably no more than about 3 weight percent lyotropic liquid-crystalline polymer or blocks. The solution preferably contains at least about 0.5 weight percent lyotropic liquid-crystalline polymer or blocks, and more preferably at least about 1 percent. The solution preferably contains sufficient polymer so that a dope film without significant flaws can be made and coagulated.

The dope film may be cast or it may be extruded through a slit or tubular die. Extruded films may be optionally stretched in the direction of extrusion or the transverse direction or both. The extruded or cast film is washed using a suitable washing fluid to remove the solvent from the dope film. The washing fluid should be a diluent for the solvent acid and a non-solvent for the block copolymer or molecular composite. It is preferably water. The washing fluid may optionally contain acid or base or salts, but it need not contain them. Examples of suitable processes for making and washing films are set out in: Chenevey, U.S. Pat. No. 4,487,735 (Dec. 11, 1984); Chenevey, U.S. Pat. No. 4,898,924 (Feb. 6, 1990); Harvey et al., U.S. Pat. No. 4,939,235 (Jul. 3, 1990); Harvey et al., U.S. Pat. No. 4,934,285 (Oct. 16, 1990); and Pierini et al., U.S. patent application Ser. No. 07/670,135 (filed Mar. 15, 1991), which are incorporated herein by reference.

The washed film should remain wet and not be dried until after completion of the stretching process of this invention. The film to be stretched preferably contains at least about 10 weight percent washing fluid, more preferably at least about 40 weight percent washing fluid and most preferably at least about 50 weight percent washing fluid. It is theorized that the concentration of washing fluid in the wet, never-dried film increases the film's flexibility, allowing it to be stretched or extended without easy breakage. The higher degree of stretching instills a higher orientation into the film, resulting in higher mechanical properties for the film. The never-dried film contains sufficient water to realize these benefits. However, a film that has been dried will not usually regain enough water to be flexible for stretching.

The wet film is stretched at least 10 percent in at least one direction. The film is preferably stretched in at least two directions which are perpendicular to each other. The directions of stretching will usually be in the direction of extruding or casting the film ("the machine direction"), and/or approximately perpendicular to the direction of extrusion or casting the film ("the transverse direction"). The film is preferably stretched at least about 25 percent in each direction, more preferably at least about 40 percent in each direction, and most preferably at least about 60 percent in each direction. The film may be stretched by any ordinary film-stretching method. For instance, it may be drawn in the machine direction between rollers; it may be stretched in the transverse direction using either a tentering process, a mandrel or a bubble process; or it may be simultaneously stretched using a batch mechanical stretcher such as a film-stretching apparatus commercially available T. M. Long Co. The maximum stretch is not critical. It is ordinarily limited by practical considerations, such as the ability of the wet film to stretch without tearing and the physical limitations of the stretching equipment. The film is not usually stretched more than about 80 percent in any direction.

The conditions of stretching ar not critical as long as they do not interfere with the stretching process. The stretching process may be carried at any temperature at which the liquid in the never-dried film remains liquid. The temperature is usually greater than 0° C. and less than 100° C. It is conveniently at about ambient temperature. The pressure may be any pressure at which the film remains wet. It may be subatmospheric or superatmospheric but is preferably about atmospheric pressure.

After the film is stretched, it is dried. Suitable processes to dry molecular composite and block copolymer films are described in Dixit et al., U.S. Ser. No. 859,177 (filed Mar. 27, 1992). The film is preferably contacted with an air flow at a temperature suitable to remove the retained liquid. The temperature is preferably at lest about 50° C., more preferably at least about 80° C. and most preferably at least about 100° C. The film is preferably restrained to prevent shrinkage during the drying process. The pressure of drying may be above atmospheric pressure, below atmospheric pressure or about atmospheric pressure. It is preferably about atmospheric pressure or less. The dried film preferably contains no more than about 0.1 weight percent water, and more preferably contains no more than about 0.001 weight percent water.

The tensile strength and modulus of the stretched films made the process of the present invention preferably superior to the same properties in a similar unstretched film. The tensile strength preferably increases by at least about 50 percent and more preferably at least about 100 percent in the direction of stretching. The tensile modulus is preferably at least about 50 percent greater, more preferably at least about 100 percent greater and most preferably at least about 200 percent greater than the modulus of an unstretched film. The absolute numbers for the tensile strength and tensile modulus vary widely depending upon the composition and processing conditions used for the film. The film is useful in structural and electronics applications, such as honeycombs, laminates, circuit board substrates, and capacitor films.

Illustrative Examples

The following examples are for illustrative purposes only and should not be taken as limiting the scope of either the specification or the claims. Unless stated otherwise, all parts and percentages are by weight.

EXAMPLE A

Preparation of Wet, Never-dried Film.

A dope is obtained that contains methane-sulfonic acid, polyphosphoric acid, and 3 weight percent block copolymer. The block copolymer contains 70 weight percent rigid-rod cis-polybenzoxazole blocks and 30 weight percent thermoplastic polybenzoxazole-poly(ether ketone) copolymer. It is similar to polymers described in col. 75, examples 15-17, of Harris et al., U.S. Pat. No. 5,098,985 (Mar. 24, 1992), which is incorporated herein by reference. The dope is extruded through a slit die into air and is wound up on a drum that is submerged in a water bath. The film is washed in running, fresh water for 24 hours to remove substantially all residual acid. The film is cut to 4.5 inch by 4.5 inch samples.

All film stretching performed in the Examples is carried out using a commercially available laboratory film stretching apparatus sold by T. M. Long Co. The clamps of the stretching apparatus are attached to the external 0.5 in. perimeter around the film, so that the area stretched is about 4 in. by 4 in. square. After the film is stretched, washed and dried, the external perimeter is trimmed off, so that all measurements are based upon the stretched portion of the film only. Tensile properties are measured by ASTM method D-882 using INSTRON ™ tensile testing apparatus.

EXAMPLE 1

Machine Direction Stretching

A film sample from Example A is stretched in the machine direction to 6.4 inches in length from 4 inches in length (a stretch ratio of 1.6×). The film is dried in place using a hair dryer. The tensile strength of the film in the machine direction is 54.66 ksi, and the tensile modulus in the machine direction is 2.416 msi.

EXAMPLE 2

Transverse Stretching

A film sample from Example A is stretched in the transverse direction to 6.4 inches in width from 4 inches (a stretch ratio of 1.6×). The film is dried in place using a hair dryer. The tensile strength of the film in the transverse direction is 39.173 ksi, and the tensile modulus is 1.626 msi.

EXAMPLE 3

Biaxial Stretching

A film sample from Example 1 is stretched to a size of 5.6 inches by 5.6 inches from a size of 4 inches by 4 inches (a biaxial stretch of 1.4× in each direction). The tensile strength of the film is 30.434 ksi in the machine direction and 22.620 ksi in the transverse direction. The tensile modulus of the film is 1.163 msi in the machine direction and 0.801 msi in the transverse direction.

COMPARATIVE EXAMPLE C-1

The tensile strength of the film that was dried without stretching in Example A is 21.59 ksi in the machine direction and 19.96 ksi in the transverse direction. The tensile modulus of that film is 0.740 msi in the machine direction and 0.701 msi in the transverse direction.

What is claimed is:

1. A process to make an improved film that contains either: (a) a molecular composite of lyotropic liquid crystalline polymer and thermoplastic polymer, or (b) a block copolymer having blocks of lyotropic liquid crystalline polymer and blocks of thermoplastic polymer, said process comprising the steps of:
   (1) contacting a dope film, that contains a solvent and the molecular composite or block copolymer, with a washing fluid under conditions such that substantially all of the solvent is removed from the film;
   (2) stretching the wet, never-dried film from Step (1) at least 10 percent in at least one direction; and
   (3) drying the film from Step (2).

2. The process of claim 1 wherein the washing fluid is an aqueous washing fluid.

3. The process of claim 2 wherein the film contains at least about 10 weight percent water when it is stretched.

4. The process of claim 2 wherein the film contains a molecular composite.

5. The process of claim 2 wherein the film contains a block copolymer.

6. The process of claim 2 wherein the film is stretched in at least two directions which are about perpendicular to each other.

7. The process of claim 2 wherein the film is stretched by at least about 50 percent.

8. The process of claim 2 wherein the film contains at least about 40 weight percent water at the beginning of Step (2).

* * * * *